(12) United States Patent
Zeh et al.

(10) Patent No.: US 10,972,268 B2
(45) Date of Patent: Apr. 6, 2021

(54) CRYPTOGRAPHIC DIVERSITY

(71) Applicant: Infineon Technologies AG, Neubiberg (DE)

(72) Inventors: Alexander Zeh, Munich (DE); Viola Rieger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 303 days.

(21) Appl. No.: 16/134,202

(22) Filed: Sep. 18, 2018

(65) Prior Publication Data

US 2020/0092098 A1 Mar. 19, 2020

(51) Int. Cl.
- *H04L 9/00* (2006.01)
- *H04L 9/08* (2006.01)
- *G06F 21/72* (2013.01)

(52) U.S. Cl.
CPC ............ *H04L 9/0897* (2013.01); *G06F 21/72* (2013.01); *H04L 2209/12* (2013.01); *H04L 2209/84* (2013.01)

(58) Field of Classification Search
CPC ..... G06F 21/72; H04L 9/0631; H04L 9/0643; H04L 9/0897
See application file for complete search history.

(56) References Cited

U.S. PATENT DOCUMENTS

| | | | |
|---|---|---|---|
| 2008/0056488 A1* | 3/2008 | Motoyama | G06F 21/72 380/29 |
| 2014/0006797 A1* | 1/2014 | Cordella | G06F 12/1408 713/189 |
| 2016/0344541 A1* | 11/2016 | Duplys | H04L 9/004 |

* cited by examiner

*Primary Examiner* — Beemnet W Dada
(74) *Attorney, Agent, or Firm* — Schiff Hardin LLP (57) ABSTRACT

A Cryptographic Unit (CU) of a microcontroller, the CU including a first accelerator configured to generate first encrypted output data based on input data; and a second accelerator which is configured to be diversely implemented with respect to the first accelerator, and is configured to generate second encrypted output data based on the input data; and a comparator configured to compare a first comparator data obtained from the generation of the first encrypted output data with a second comparator data obtained from the generation of the second encrypted output data, and if the comparison indicates that the first and second comparator data differ, output an event signal pertaining to an event in a safety domain or a security domain.

20 Claims, 7 Drawing Sheets

CRYPTOGRAPHIC DIVERSITY

BACKGROUND

Cryptography ensures confidentiality, authenticity, and data integrity, and will become more prominent in the automotive semiconductor industry where functional safety, real-time constraints, and energy-consumption are important.

In-vehicle automotive networks are comprised of Electronic Control Units (ECUs) at nodes, and communication networks coupled to the ECUs. The ECU may be microcontroller, also known as a Micro Control Unit (MCU) or microcontroller unit. The communication networks include, for example, Controller Area Networks (CAN), CAN Flexible Data-Rates (FD) networks, and Ethernet.

Microcontroller security functionality in hardware is concentrated inside a root of trust, also known as a Hardware Security Module (HSM) or Cryptographic Unit (CU). In order to provide fast authentication and encryption of program code and data, cryptographic algorithms are implemented in hardware (e.g., accelerators) where operations can be performed faster than in software. Examples of hardware accelerators include Advanced Encryption Standard (AES), Elliptic Curve Cryptography (ECC), and Secure Hash Algorithm (SHA). A hardware accelerator may be part of the HSM, or configured to be served by a dedicated secure master inside the microcontroller.

Hardware support for cryptographic functions should take into consideration safety constraints. Security events and security related functionality in prior cryptographic hardware accelerators are not safety related. Thus, there are no safety mechanisms for detection or correction of faults within the cryptographic functionality. If functional safety is required for the computation of cryptographic operations, the performance advantage of hardware accelerators can be used.

BRIEF DESCRIPTION OF THE DRAWINGS

Throughout the figures similar reference numerals indicate similar components, but with a first digit changed to correspond with the figure being described.

DETAILED DESCRIPTION

The present disclosure is directed to a Cryptographic Unit (CU) of a microcontroller, wherein the CU has a second cryptographic accelerator having diversity with respect to a first cryptographic accelerator in order to detect an event in a safety or security domain.

Figure 1:
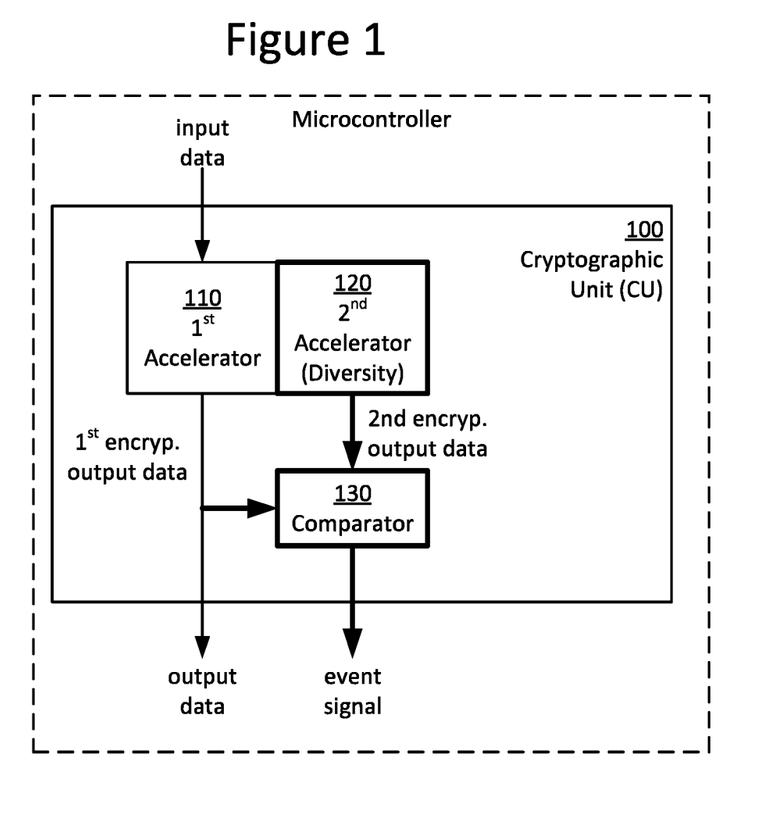
FIG. 1 illustrates a schematic diagram of a generalized Cryptographic Unit (CU) of a microcontroller in accordance with aspects of the disclosure.

FIG. 1 illustrates a schematic diagram of a generalized Cryptographic Unit (CU) 100 of a microcontroller in accordance with aspects of the disclosure.

The CU 100 comprises a first accelerator 110, a second accelerator 120, and a comparator 130.

The first accelerator 110 is configured to generate first encrypted output data based on input data.

The second accelerator 120, which is diversely implemented with respect to the first accelerator 120, is configured to generate second encrypted output data based on the input data. This diverse implementation may be, for example, any of separation of area domain diversity, separation of voltage domain diversity, and/or separation of timing domain diversity, as described in detail below with respect to FIGS. 4A-4C. Alternatively or in addition to these types of diversity, a function of an accelerator may be implemented in diverse manner, for example, by applying techniques of error correction and/or detection on the algorithm itself.

The comparator 130 is configured to compare a first comparator data obtained from the generation of the first encrypted output data with a second comparator data obtained from the generation of the second encrypted output data. The first and second comparator data may be the first and second encrypted output data, respectively. If the comparison indicates that the first and second comparator data differ, the comparator 130 is configured to output an event signal pertaining to an event in a safety domain or a security domain. Alternatively or additionally, if during runtime the comparison indicates that any of the first and second comparator data differ, the first and second accelerators 110, 120 may be configured to stop the generation of the first and second encrypted output data and/or generate an error signal.

A microcontroller may have a safety domain and a security domain. The CU 100 may be placed in one or both of the safety domain and the security domain. The security domain is more secure than the safety domain.

The safety domain is where actions are performed in a safe manner to maintain reliability and/or operability of the microcontroller and/or operability of the microcontroller. The safety domain is protected against probabilistic errors, random errors, and unintentional errors. A safety signal may be transmitted outside the safety domain should an error occur against the safety domain being protected. In other words the safety signal may be provided to signal the safety error to an entity different from the safety domain. This entity may be in a hierarchical relationship with the safety domain, for example, controlling the safety domain.

The security domain restricts/maintains access from outside its domain. The security domain has stored therein cryptographic keys, secrets, privacy information, etc. The security domain is protected against intentional errors, such as attacks. A security signal stays within the security domain.

Figure 2A:
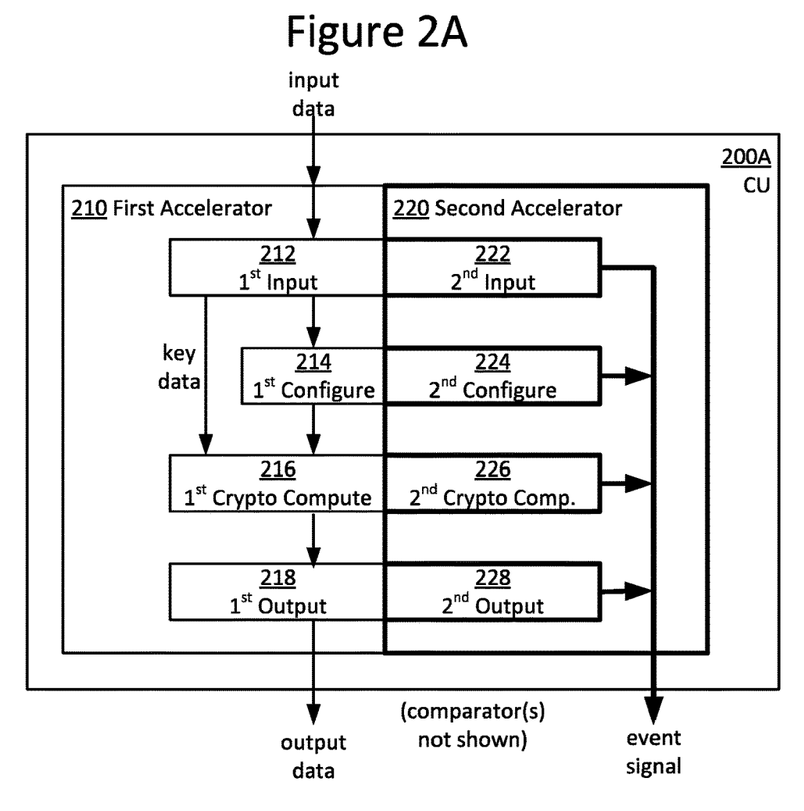
FIG. 2A illustrates a schematic diagram of a CU in accordance with aspects of the disclosure.

FIG. 2A illustrates a schematic diagram of a CU 200A in accordance with aspects of the disclosure. Similar reference numerals as compared with FIG. 1 indicate similar components, but with a first digit changed to correspond with this figure. For the sake of brevity, some of the details of similar components will not be repeated here.

The first accelerator 210 comprises a first input interface 212, a first configuration circuit 214, a first crypto compute processor 216, and a first output interface 218, any of which is configured to output data as the first comparator data. The first input interface 212 receives input data, the first configuration circuit 214 receives data from the first input interface 212, the first crypto compute processor 216 receives data from the first configuration circuit 214, and the first output interface 218 receives data from the first crypto compute processor 216. The first crypto compute processor 216 additionally receives key data directly from the first input interface 212.

The second accelerator 220 comprises a second input interface 222, a second configuration circuit 224, a second crypto compute processor 226, and a second output interface 228, any of which is configured to output data as the second comparator data corresponding with the first comparator data. The second accelerator 220 may be configured to perform in lockstep with the first accelerator 210. There are cases in which the first accelerator 210 and the second accelerator 2220 do not perform in lockstep, for example, in the case of separation of timing domain diversity described below.

The first and second input interfaces 212, 222 are each configured to receive input data, which may comprise configuration data, for a cryptographic operation. The input data may be any data stored in global microcontroller memory or communication data received from a communication interface that needs to be encrypted/decrypted and/or authenticated/signed. The first and second input interfaces 212, 222 may be implemented with redundant registers, safety flip-flops, or the like. A safety flip-flop is a flip-flop comprising redundant registers receiving a same input.

The first and second configuration circuits 214, 224 provide redundancy in order to detect and/or correct an incorrect configuration of a cryptographic function performed by any of the crypto compute 216, 226. The first and second configuration circuits 214, 224 are each configured to provide a configuration of respective crypto computes 216, 226, define a mode of crypto compute 216, 226 with keys, initialization, nonce, operation mode, etc. The first and second configuration circuits 214, 224 may be implemented with redundant flip-flops. Optionally, each of the first and second configuration circuits 214, 224 may be configured to be modified within a temporal window only, that is, only during a predetermined period of time until modification rights expire.

The first and second crypto compute processors 216, 226 provide redundancy in order to detect errors in the cryptographic operation itself. The first and second crypto compute processors 216, 226 are each configured to execute a cryptographic operation, which could be any symmetric cipher, asymmetric algorithm, or hash function. The first and second crypto compute processors 216, 226 may be implemented with Error-Correcting Codes ECC (e.g., parity prediction) as described with respect to FIG. 2C. It will be appreciated that if the first and second crypto compute processors 216, 226 are provided with respective ECCs, depending on the ECC and a concrete error pattern, it may be possible to not only identify that this error pattern occurred in one of the first and second crypto compute processors 216, 226, but also which of the two failed due the error pattern.

The first and second output interfaces 218, 228 provide redundancy in order to detect and/or correct transmission errors for output data. The first and second output interfaces 218, 228 are each configured to output a cryptographic operation. The first and second output interfaces 218, 228 may be implemented with redundant registers, safety flip-flops, or the like.

The first input interface 212, the first configuration circuit 214, the first crypto compute processor 216, and the first output interface 218 are paired with the second input interface 222, the second configuration circuit 224, the second crypto compute processor 226, and the second output interface 228, respectively, to detect or correct single point transient faults. The paired components are configured to perform in lockstep, except in the case of timing diversity described with respect to FIG. 4C.

The comparator(s) (not shown in FIG. 2A) is/are configured to compare the first comparator data and the second comparator data, as described above with respect to FIG. 1, for runtime monitoring of the CU 200A. There may be a single comparator, or respective comparators for the paired input interfaces 212, 222, the configuration circuits 214, 224, the crypto compute processors 216, 226, and the output interfaces 218, 228.

If the comparison indicates that the first and second comparator data differ, the comparator may be configured to output an event signal pertaining to an event in the safety domain or the security domain. Alternatively or additionally, if during runtime the comparison indicates that the first and second comparator data differ, the first and second accelerators 210A, 220A may be configured to stop the generation of the first or second encrypted output data, respectively. Alternatively or additionally, if during runtime the comparison indicates that the first and second comparator data differ, the comparator (not shown in FIG. 2A) may be configured to generate an error signal.

The event signal output from the CU 200A is a summation of any event signals output by the second input interface 222, the second configuration circuit 224, the second crypto compute processor 226, and the second output interface 228, and may be with respect to a safety and/or security domain.

The CU 200A is configured to process in steps, that is input, configure, crypt compute, and output. If an error is detected in one step, such as the input, then the process may be terminated early without the CU 200A performing all of the steps.

Figure 2B:
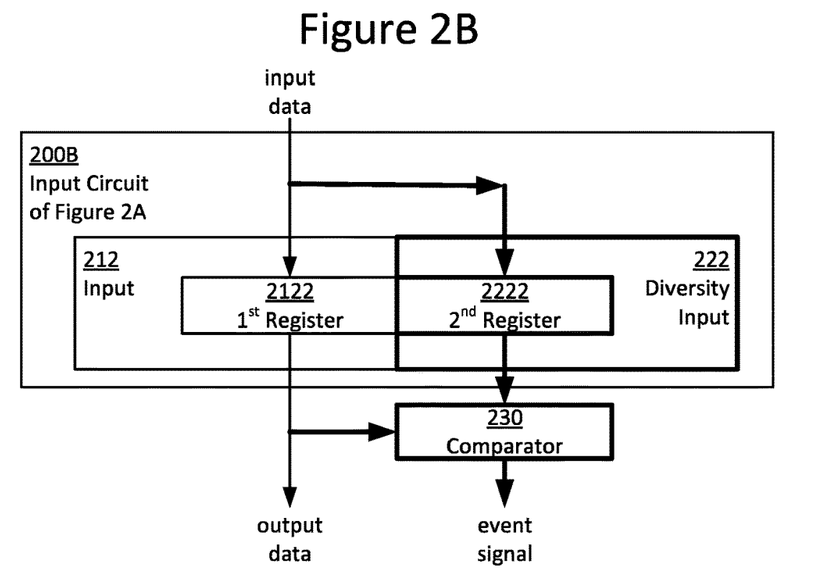
FIG. 2B illustrates schematic diagrams of the input circuit and comparator of FIG. 2A.

FIG. 2B illustrates a schematic diagram of the input circuit 200B (212 and 222) and comparator 230 of FIG. 2A.

The input circuit 200B provides redundancy in order to detect and/or correct transmission errors in the input data.

The input circuit 200B may comprise a redundant flip-flop. A redundant flip-flop comprises a first register 2122, a second register 2222, and the comparator 230. The first register 2122 is configured to store the first comparator data of the first accelerator's input interface 212. The second register 2222 is configured to receive the same input data as the first register 2122, and store the second comparator data of the second accelerator's input interface 222. The comparator 230 is configured to compare the contents of the first comparator data of the first register 2122 and the second comparator data of the second register 2222 to determine whether the content is identical, indicating a reliable transfer of the input data.

This same implementation may apply to the configuration circuits 214, 224, and the output interfaces 218, 228, but not to the crypto compute processors 216, 226 of the aspects discussed with regard to FIG. 2A. The crypto compute processors 216, 226 have a different implementation, as described with respect to FIG. 2C.

Figure 2C:
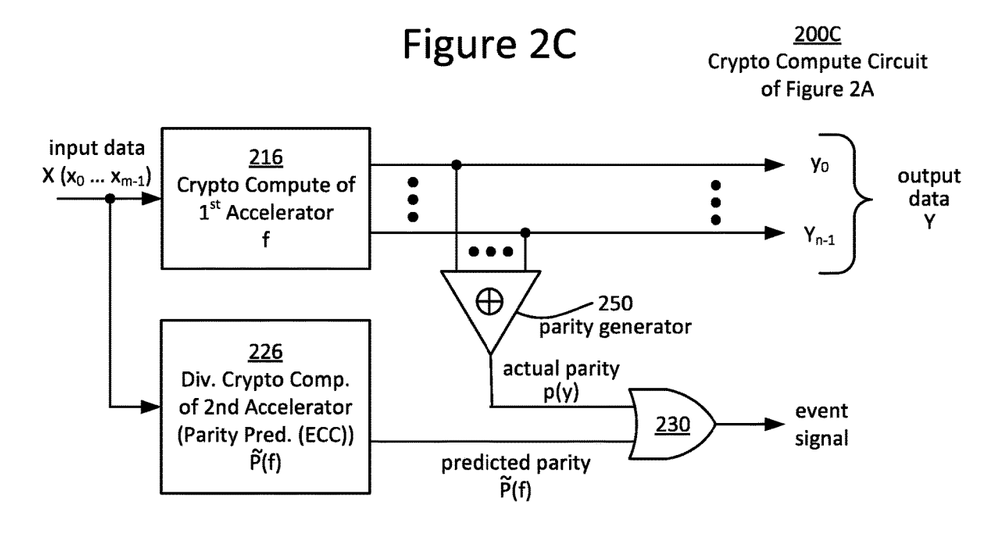
FIG. 2C illustrates a schematic diagram of the crypto compute circuit and comparator of FIG. 2A.

FIG. 2C illustrates a schematic diagram of a crypto compute circuit 200C (216 and 226) and comparator 230 of FIG. 2A.

The crypto compute circuit 200C comprises crypto compute 216 of first accelerator 210, diversity crypto compute 226 of second accelerator 220, comparator 230, and a parity generator 250. The crypto compute 216 and the diversity crypto compute 226 are configured to receive the input data X ($x_0 \ldots x_{m-1}$), where m is an integer greater than or equal to 1). The crypto compute 216 is configured to transmit the output data Y ($y_0 \ldots y_{n-1}$), where n is an integer greater than or equal to 1. The output data Y is computed using the crypto function f associated with the first crypto compute 216.

The parity generator 250 is configured to receive the output data Y and generate, based on the first encrypted output data as the first comparator data, an actual parity p(y) as first comparator data. The calculation of the actual parity P(y) is an exclusive or (XOR) of all the output data. A parity predictor within the diversity crypto compute 226 is configured to generate, based on the input data X, a predicted parity $\tilde{P}(f)$ as the second comparator data. The comparator 230 is configured to compare the actual parity p(y) and the predicted parity $\tilde{P}(f)$ and output an event signal in case they are not identical as described before.

Figure 3A:
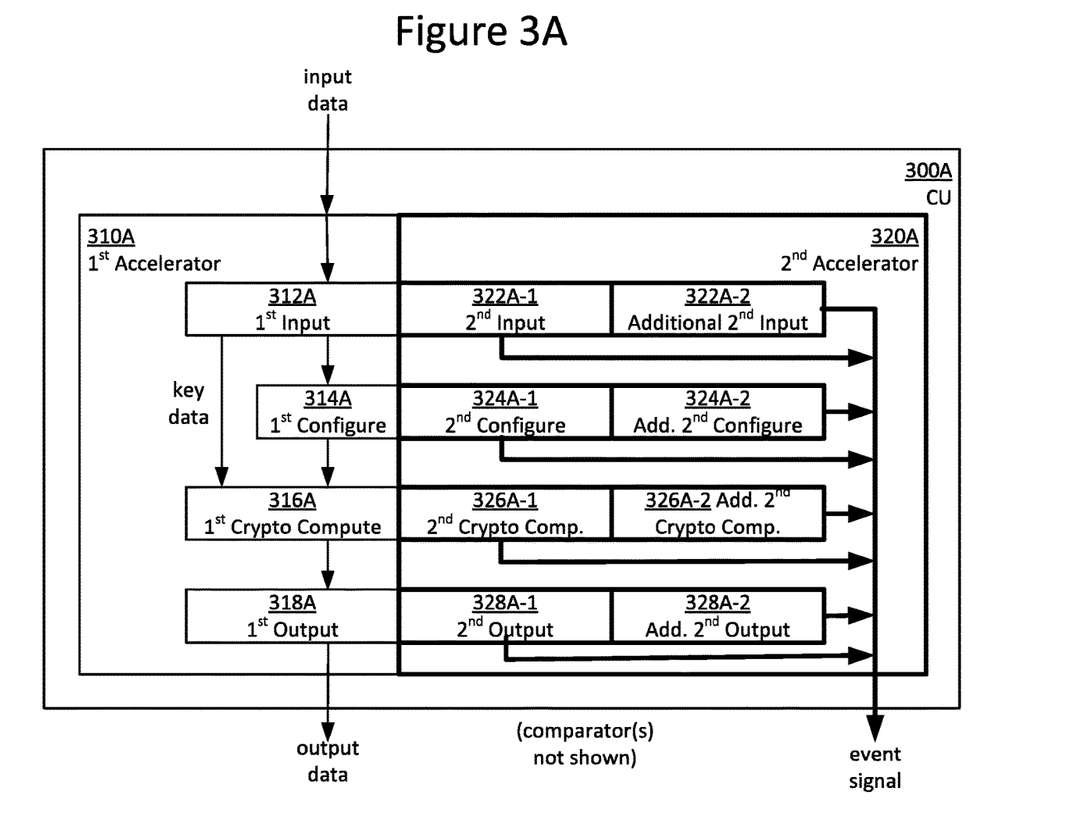
FIGS. 3A and 3B illustrate schematic diagrams of CUs in accordance with aspects of the disclosure.

FIG. 3A illustrates a schematic diagram of a CU 300A in accordance with aspects of the disclosure. Similar reference numerals as compared with prior figures indicate similar components, but with a first digit changed to correspond with this figure. For the sake of brevity, some of the details of similar components will not be repeated here.

The CU 300A comprises a first accelerator 310A, a second accelerator 320A, and a comparator (not shown in FIG. 3A but described below).

The first accelerator 310A comprises a first input interface 312A, a first configuration circuit 314A, a first crypto compute processor 316A, and a first output interface 318A, any of which is configured to output data as a first comparator data.

The second accelerator 320A comprises a second input interface 322A-1, a second configuration circuit 324A-1, a second crypto compute processor 326A-1, and a second output interface 328A-1, any of which is configured to output data as a second comparator data.

The second accelerator 320A may also be provided with an additional mechanism to detect multipoint transient faults. More specifically, the second accelerator 320A may also comprises an additional second input interface 322A-2, an additional second configuration circuit 324A-2, an additional second crypto compute processor 326A-2, and an additional second output interface 328A-2, any of which is configured to output data as an additional second comparator data.

The additional second input interface 322A-2 provides redundancy in order to detect errors in at least one of the second input interface 322A-1 and the additional second interface 322A-2 within the second accelerator 320A. The additional second configuration circuit 324A-2 provides redundancy in order to detect errors in at least one of the second configuration circuit 324A-1 and the additional second configuration circuit 324A-2. The additional second crypto compute processor 326A-2 provides redundancy in order to detect errors in at least one of the second crypto compute processor 326A-1 and the additional second crypto compute processor 326A-2. The additional second output interface 328A-2 provides redundancy in order to detect errors in at least one of the second output interface 328A-1 and the additional second output interface 328A-2.

The first and second accelerators 310A, 320A may have diversity with respect to one another. More specifically, the first, second, and additional input interfaces 312A, 322A-1, 322A-2 may have diversity with respect to one another. The first, second, and additional configuration circuits 314A, 314A-1, 413A-2 may have diversity with respect to one another. The first, second, and additional crypto compute processors 316A, 316A-1, 316A-2 interfaces may have diversity with respect to one another. The first, second, and additional output interfaces 318A, 318A-1, 318A-2 have diversity with respect to one another.

The comparator (not shown in FIG. 3A) may comprise one or more comparators configured to compare the first comparator data, the second comparator data, and the additional second comparator data for runtime monitoring of the CU 300A. The comparator may aggregate the first comparator data, second comparator data, and the additional second comparator data and perform a majority voting between multiple values of a same kind. By doing so, it is not only possible to identify when an error occurs, but also determine which one of the multiple comparator data is in error.

If the comparison indicates that any of the first, second, and additional second comparator data differ, the comparator may be configured to output an event signal pertaining to an event in the safety domain or the security domain. Alternatively or additionally, if during runtime the comparison indicates that any of the first, second, and additional second comparator data differ, the first and second accelerators 310A, 320A may be configured to stop the generation of the first or second encrypted output data, respectively. Alternatively or additionally, if during runtime the comparison indicates that any of the first, second, and additional second comparator data differ, the comparator may be configured to generate an error signal.

An event signal output by the CU 300A is a summation of any event signals output by the second and additional second input interfaces 322A-1, 322A-2, the second and additional second configuration circuits 324A-1, 324A-2, the second and additional second crypto compute processors 326A-1, 326A-2, and the second and additional second output interfaces 328A-1, 328A-2, and may be with respect to a safety and/or security domain.

Figure 3B:
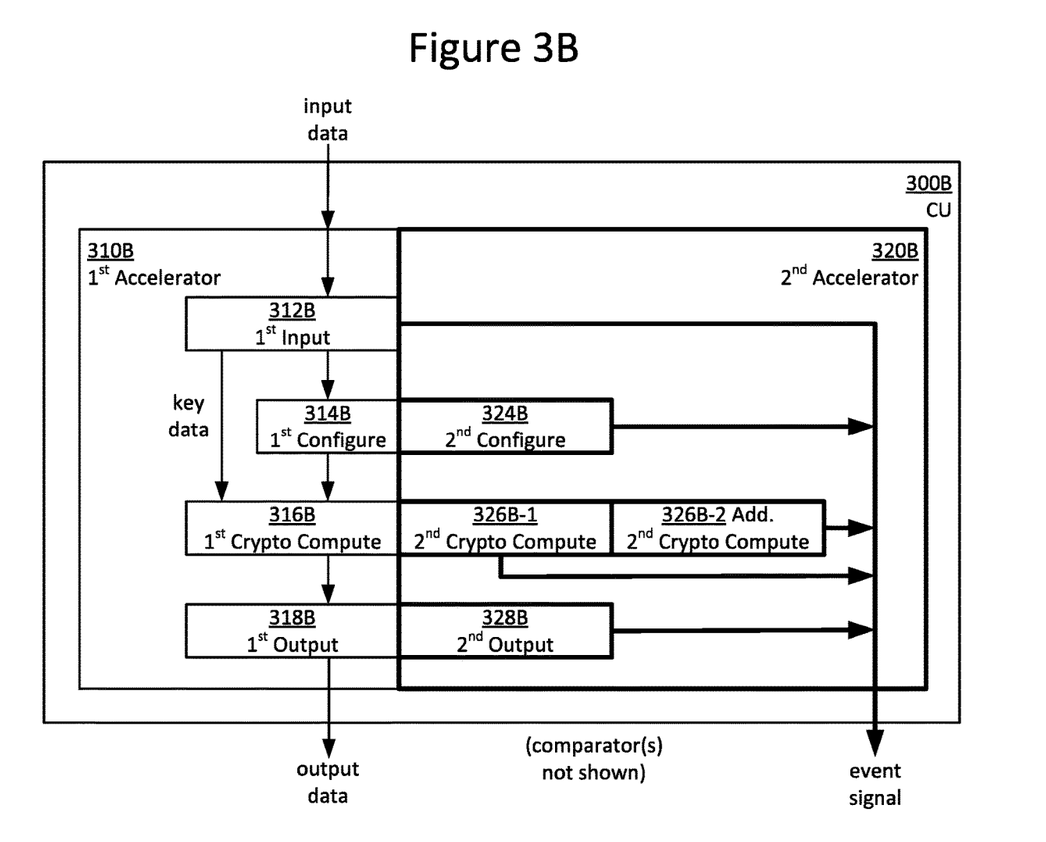

FIG. 3B illustrates a schematic diagram of a CU 300B in accordance with aspects of the disclosure. The CU 300B implements runtime monitoring of a crypto compute 316B.

The CU 300B is similar to the CU 300A of FIG. 3A, except that it has reduced complexity by simplifying the input interface circuit, the configuration circuit, and the output interface circuit. More specifically, the second accelerator 320B does not comprise any second input interface configured to be diversely implemented. Also, the second accelerator 320B does not comprise an additional second configuration circuit or an additional second output interface circuit configured to be diversely implemented. There are circumstances where it is not necessary to know which one of the paired second and additional second devices failed, only that there was an error. Depending on safety and/or security requirements, however, it may be in some situations be of interest to identify those paired second and additional second devices that failed, as is the case for the more complex example of FIG. 3A discussed above.

Figure 4A:
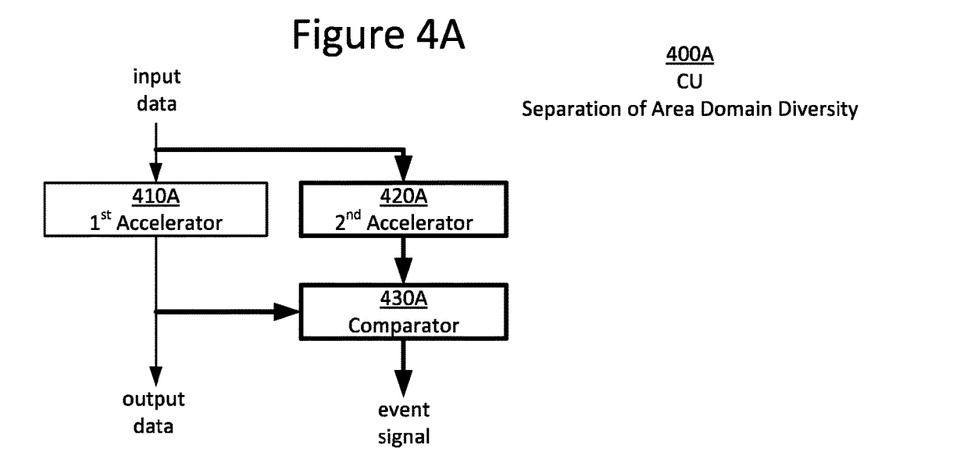
FIG. 4A illustrates a schematic diagram of a CU with separation of area domain diversity in accordance with aspects of the disclosure.
Figure 4B:
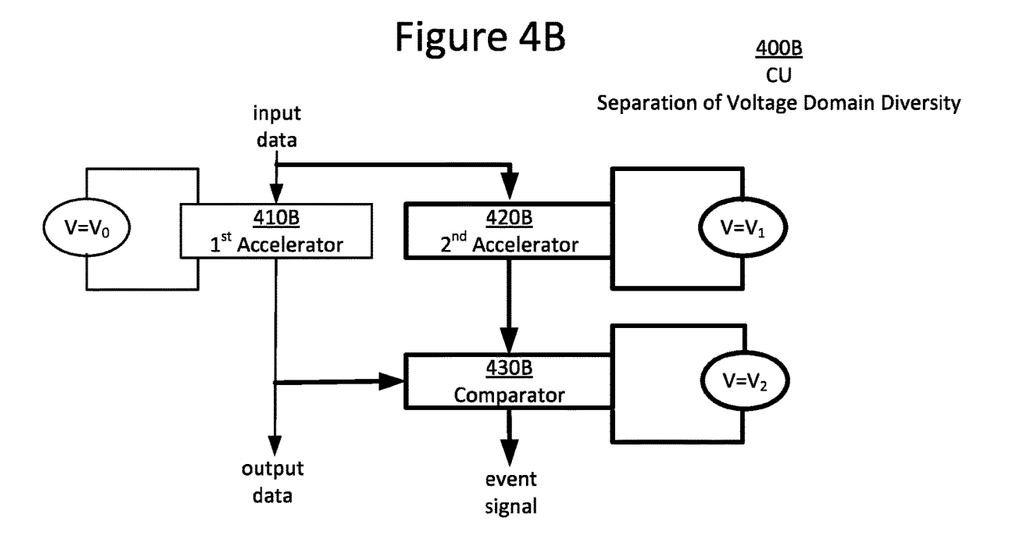
FIG. 4B illustrates a schematic diagram of a CU with separation of voltage domain diversity in accordance with aspects of the disclosure.
Figure 4C:
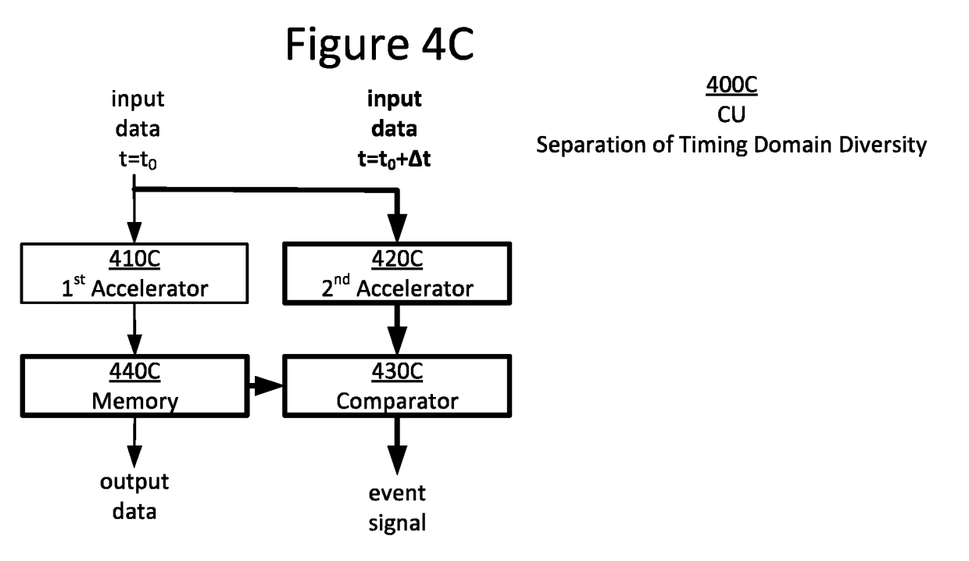
FIG. 4C illustrates a schematic diagram of a CU with separation of timing domain diversity in accordance with aspects of the disclosure.

FIGS. 4A-4C illustrates schematic diagrams of CUs that have enhanced reliability due to diverse hardware, making it possible to reach automotive safety integrity levels up to ASIL-D. The diverse hardware may be realized as follows.

FIG. 4A illustrates a schematic diagram of a CU 400A with separation of area domain diversity in accordance with aspects of the disclosure.

The CU 400A comprises a first accelerator 410A, a second accelerator 420A, and a comparator 430A. The second accelerator 420 is configured to be diversely implemented with respect to the first accelerator 410 by being spatially separated on a chip from the first accelerator 410. The spatial separation permits detection of error events that affect a relatively small portion of the chip area as long as at least one of the first accelerator 410A, the second accelerator 420A, and the comparator 430A are affected by the error event, such as a crack in the substrate.

FIG. 4B illustrates a schematic diagram of a CU 400B with separation of voltage domain diversity in accordance with aspects of the disclosure.

The CU 400B comprises a first accelerator 410B, a second accelerator 420B, and a comparator 430B. The second accelerator 420B is configured to be diversely implemented with respect to the first accelerator 410B by being supplied by a different voltage domain. More specifically, the first accelerator 410B is supplied by voltage domain $V_0$ and the second accelerator 420B is supplied by voltage domain $V_1$. The separation of voltage domains permits detection of error events that affect only the supply voltage of one of the accelerators 410B, 420B.

The comparator 430B may be supplied by a same power domain as the first or second accelerator 410B, 420B. Alternatively, the comparator 430B may be supplied by a different power domain $V_2$ than the first and second accelerators 410B, 420B in order to monitor functioning of the three power domains at just one functional element, namely the CU 400B.

FIG. 4C illustrates a schematic diagram of a CU 400C with separation of timing domain diversity in accordance with aspects of the disclosure.

The CU 400C comprises a first accelerator 410C, a second accelerator 420C, a comparator 430C, and a memory 440C. The second accelerator 420C is configured to be diversely implemented with respect to the first accelerator 410C by being temporally shifted in implementation. The first accelerator 410C receives the input data at time $t_0$, and the second accelerator 420C receives the same input data at time $t_0+\Delta t$. The separation in time permits detection of error events that affect only one of the accelerators 410C, 420C, though without any detection means other than timing domain diversity, it would not be known which of the first accelerator 410C and the second accelerator 420C failed. The memory 440C is configured to buffer output data from the first accelerator 410C for a time $\Delta t$ before being transmitted to the comparator 430C so that the first comparator data obtained from the generation of the first encrypted output data becomes temporally aligned with the second comparator data obtained from the generation of the second encrypted output data.

Different combinations of the implementations described with respect to FIGS. 4A, 4B, and 4C are feasible in order to achieve reliability for errors in area and/or voltage and/or time domains. More specifically, the second accelerator 420 (420A, 420B, and/or 420C) may be configured to be diversely implemented with respect to the first accelerator 410 by being any one or more of spatially separated on a chip, supplied by a different voltage domain, and temporally shifted in implementation, as described above with respect to FIGS. 4A, 4B, and 4C.

The Cryptographic Unit (CU) of a microcontroller as disclosed herein is applicable for secure onboard communication using automotive communication peripherals such as a Controller Area Network (CAN), Flexray, Ethernet, Peripheral Component Interconnect (PCI), radar interfaces, or other serial COMmunication port (COM) lines such as Serial Peripheral Interface (SPI), Local Interconnect Network (LIN), Single Edge Nibble Transmission (SENT), Peripheral Sensor Interface 5 (PSI5) or optical communication protocols as well as storage systems such as embedded flash.

The CU disclosed herein is a building block based on error detection codes for Electronic Control Unit (ECU) security functionality. The CU enhances the reliability of state-of-the-art cryptographic operations as the crypto compute of the present disclosure provides means of identifying that an error occurred during cryptographic acceleration.

The CU disclosed herein may be implemented to realize automotive safety integrity levels for cryptographic functions up to ASIL-D with low hardware costs. Also, the CU may also be implemented to perform runtime monitoring of a safety mechanism.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A Cryptographic Unit (CU) of a microcontroller, the CU comprising:
   a first accelerator configured to generate first encrypted output data based on input data, wherein the first accelerator comprises a first input interface, a first configuration circuit, a first crypto compute processor, and a first output interface, any of which is configured to output data as first comparator data; and
   a second accelerator configured to be diversely implemented with respect to the first accelerator, and to generate second encrypted output data based on the input data, wherein the second accelerator comprises:
      a second input interface, a second configuration circuit, a second crypto compute processor, and a second output interface, any of which is configured to output data as second comparator data corresponding with the first comparator data; and
      an additional second input interface, an additional second configuration circuit, an additional second crypto compute processor, and an additional second output interface, any of which is configured to output data as an additional second comparator data corresponding with the first and second comparator data,
   wherein the first, second, and additional input interfaces have diversity with respect to one another, the first, second, and additional configuration circuits have diversity with respect to one another, the first, second, and additional crypto compute processors interfaces have diversity with respect to one another, or the first, second, and additional output interfaces have diversity with respect to one another; and
   a comparator configured to compare the first comparator data obtained from the generation of the first encrypted output data, the second comparator data obtained from the generation of the second encrypted output data, and the additional second comparator data, and if the comparison indicates that any of the first, second, and additional second comparator data differ, output an event signal pertaining to an event in a safety domain or a security domain.

2. The CU of claim 1, wherein the first and second comparator data are the first and second encrypted output data, respectively.

3. The CU of claim 1, wherein the second accelerator is configured to be diversely implemented with respect to the first accelerator by being spatially separated on a chip from the first accelerator.

4. The CU of claim 1, wherein the second accelerator is configured to be diversely implemented with respect to the first accelerator by being supplied by a different voltage domain.

5. The CU of claim 1, wherein the second accelerator is configured to be diversely implemented with respect to the first accelerator by being temporally shifted in implementation.

6. The CU of claim 1, wherein the second accelerator is configured to be diversely implemented with respect to the first accelerator by being any one or more of spatially separated on a chip, supplied by a different voltage domain, and temporally shifted in implementation.

7. The CU of claim 1, wherein the comparator is supplied by a different power domain than the first and second accelerators.

8. The CU of claim 1, wherein if during runtime the comparison indicates that the first and second comparator data differ, the first and second accelerators are configured to stop the generation of the first and second encrypted output data, respectively.

9. The CU of claim 1, wherein if during runtime the comparison indicates that the first and second comparator data differ, the comparator is configured to generate an error signal.

10. The CU of 1, further comprising a safety flip-flop configured to implement:
a first register configured to store the first comparator data of the first accelerator's input interface;
a second register configured to store the second comparator data of the second accelerator's input interface; and
the comparator.

11. The CU of claim 1, wherein each of the first and second configuration circuits are configured to be modified only during a predetermined period of time.

12. The CU of claim 1, wherein if during runtime the comparison indicates that any of the first, second, and additional second comparator data differ, the first and second accelerators are configured to stop the generation of the first or second encrypted output data, respectively.

13. The CU of claim 1, wherein if during runtime the comparison indicates that any of the first, second, and additional second comparator data differ, the comparator is configured to generate an error signal.

14. A Cryptographic Unit (CU) of a microcontroller, the CU comprising:
a first accelerator configured to generate first encrypted output data based on input data, wherein the first accelerator comprises a first configuration circuit, a first crypto compute processor, and a first output interface, any of which is configured to output data as the first comparator data;
a second accelerator configured to be diversely implemented with respect to the first accelerator, and to generate second encrypted output data based on the input data, wherein the second accelerator comprises:
a second configuration circuit, a second crypto compute processor, and a second output interface, any of which is configured to output data as the second comparator data corresponding with the first comparator data; and
an additional second crypto compute processor configured to output data as an additional second comparator data;
wherein the first and second configuration circuits have diversity with respect to one another, the first, second and additional crypto compute processors have diversity with respect to one another, or the first and second output interfaces have diversity with respect to one another; and
a comparator is configured to compare the first comparator data obtained from the generation of the first encrypted output data and the second comparator data obtained from the generation of the second encrypted output data, or compare the first comparator data, the second comparator data, and the additional second comparator data, and if the comparison indicates that the first and second comparator data differ, or that the first, second, and additional second comparator data differ, output an event signal pertaining to an event in the safety domain or the security domain.

15. The CU of claim 14, wherein if during runtime the comparison indicates that the first and second comparator data differ, or that the first, second, and additional second comparator data differ, the first and second accelerators are configured to stop the generation of the first or second encrypted output data, respectively.

16. A Cryptographic Unit (CU) of a microcontroller, the CU comprising:
a first accelerator configured to generate first encrypted output data based on input data; and
a second accelerator configured to be diversely implemented with respect to the first accelerator, and to generate second encrypted output data based on the input data, wherein:
the second accelerator comprises a parity predictor configured to generate, based on the input data, a predicted parity as the second comparator data; and
an actual parity is generated by a parity generator based on the first encrypted output data as the first comparator data; and
a comparator configured to compare a first comparator data obtained from the generation of the first encrypted output data with a second comparator data obtained from the generation of the second encrypted output data, and if the comparison indicates that the first and second comparator data differ, output an event signal pertaining to an event in a safety domain or a security domain.

17. The CU of claim 16, wherein the actual and predicted parities are Error Correcting Code (ECC) parities.

18. The CU of claim 16, wherein:
the first accelerator comprises a first crypto compute processor configured to output data as the first comparator data;
the second accelerator comprises a second a crypto compute processor configured to output data as the second comparator data, and an additional crypto compute processor configured to output additional comparator data; and
the comparator is configured to compare the first, second, and additional comparator data, and if the comparison indicates that any of the first, second, and additional comparator data differ, output an event signal pertaining to an event in the safety domain or the security domain.

19. The CU of claim 18, wherein if during runtime the comparison indicates that any of the first, second and additional comparator data differ, the first and second accelerators are configured to stop the generation of the first and second encrypted output data.

20. The CU of claim 18, wherein if during runtime the comparison indicates that any of the first, second and additional comparator data differ, the comparator is configured to generate an error signal.

* * * * *